United States Patent [19]
Nakamura et al.

[11] Patent Number: 5,822,361
[45] Date of Patent: Oct. 13, 1998

[54] WIRELESS LAN SYSTEM AND BASE STATION APPARATUS

[75] Inventors: Kazunori Nakamura, Hadano; Hidehiko Jusa, Kawasaki; Atsushi Anzai, Kanagawa-ken, all of Japan

[73] Assignee: Hitachi, Ltd. and Hitachi Microcomputer System Ltd., Tokyo, Japan

[21] Appl. No.: 555,512

[22] Filed: Nov. 8, 1995

[30] Foreign Application Priority Data

Nov. 11, 1994 [JP] Japan .................................. 6-277880

[51] Int. Cl.$^6$ .................................................. H04B 1/713
[52] U.S. Cl. .......................... 375/202; 370/330; 370/338
[58] Field of Search .................................. 375/202, 200, 375/356, 357, 346; 370/437, 337, 465, 347, 395, 443, 447, 461, 329, 330, 338, 342

[56] References Cited

U.S. PATENT DOCUMENTS

| | | |
|---|---|---|
| 4,850,036 | 7/1989 | Smith . |
| 4,872,205 | 10/1989 | Smith . |
| 5,287,384 | 2/1994 | Avery et al. ............................ 375/202 |
| 5,394,433 | 2/1995 | Bantz et al. . |
| 5,442,659 | 8/1995 | Bauchot et al. ........................ 375/202 |
| 5,446,769 | 8/1995 | Shaver et al. ............................ 375/202 |

OTHER PUBLICATIONS

IEEE 802.11 Working Document, IEEE P802.11/92–39, "Medium Access Control Protocol for Wireless LANs", Natarajan et al, Mar. 9, 1992, pp. 1–23.

*Primary Examiner*—Don N. Vo
*Attorney, Agent, or Firm*—Fay, Sharpe, Beall, Fagan, Minnich & McKee

[57] ABSTRACT

A wireless LAN system which allows the transmission and reception of various data without lowering the transmission efficiency and the transmission quality even in an overlapping environment of areas of a plurality of wireless LANs and a base station apparatus therefor are provided. The wireless LAN system has a plurality of wireless LANs including base stations and wireless terminal devices, and the base stations and the wireless terminal devices in the wireless LANs communicate while sequentially hopping carrier frequencies to conduct the intercommunication between the base stations in the wireless LANs through inter-base station communication units. Each base station includes a unit for transmitting and receiving a specific frame to and from other base stations through the inter-base station communication unit to determine whether its own base station is a master base station or not and a unit for assigning different hopping start frequencies to its own base station and other base stations when its own base station is determined as the master base station.

28 Claims, 11 Drawing Sheets

FIG.3

| TIMER NAME | APPLICATION | DEFAULT VALUE |
|---|---|---|
| TSB1 | TRANSMISSION INTERVAL FOR SBP1 FRAME | 55ms |
| TMBB | TIME TO DETERMINE THAT ITS OWN STATION IS MASTER IN MASTER BASE STATION DETERMINATION NEGOTIATION PROCESS | 550ms |
| TMBX | TIMEOUT TIME OF MASTER BASE STATION DETERMINATION NEGOTIATION PROCESS | 150s |
| TSB3 | SBP3 TRANSMISSION INTERVAL | 110ms |
| TMBP | MBP TRANSMISSION INTERVAL | 1s |
| TMBC | MBP RECEPTION MONITOR TIMEOUT TIME | 5s |

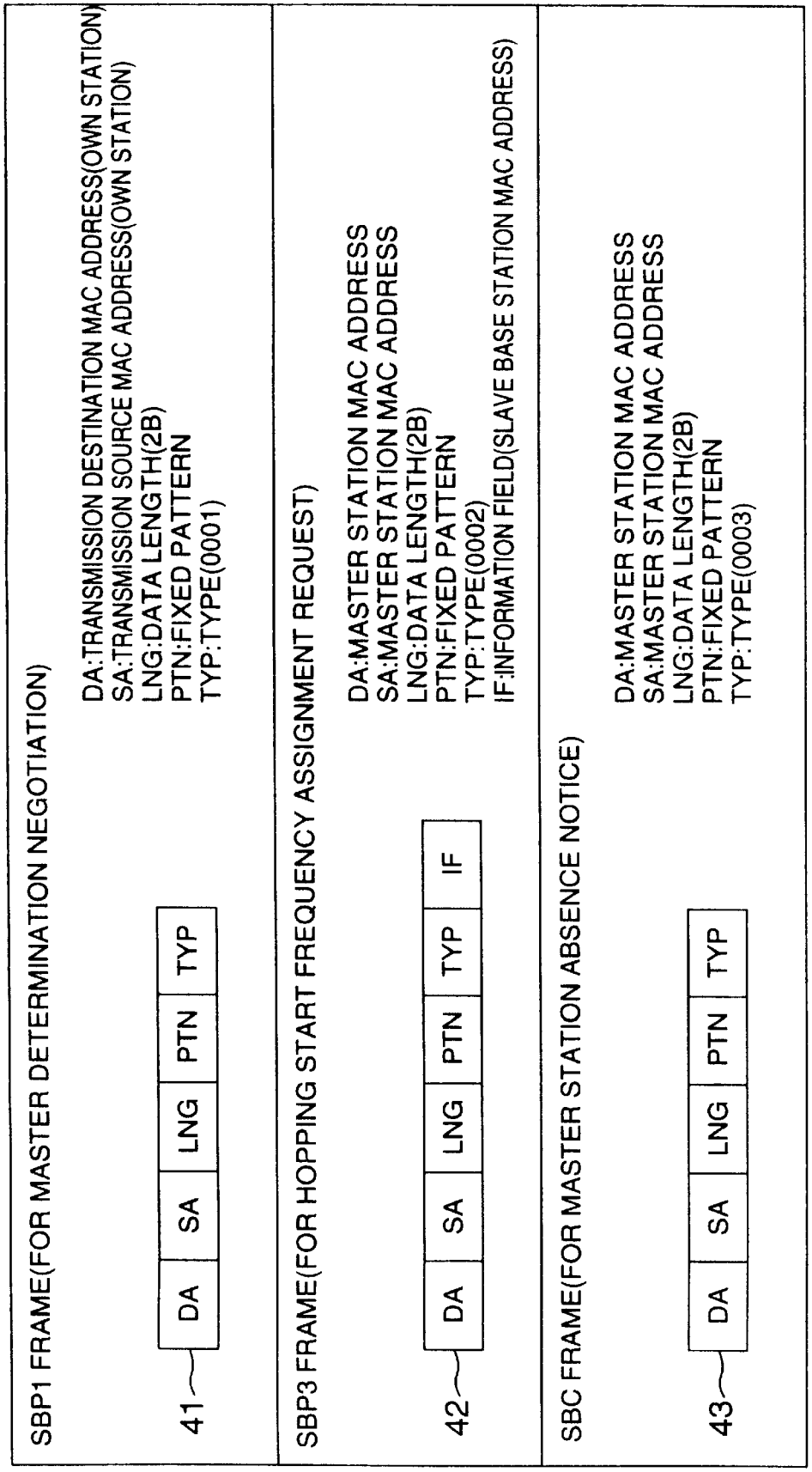

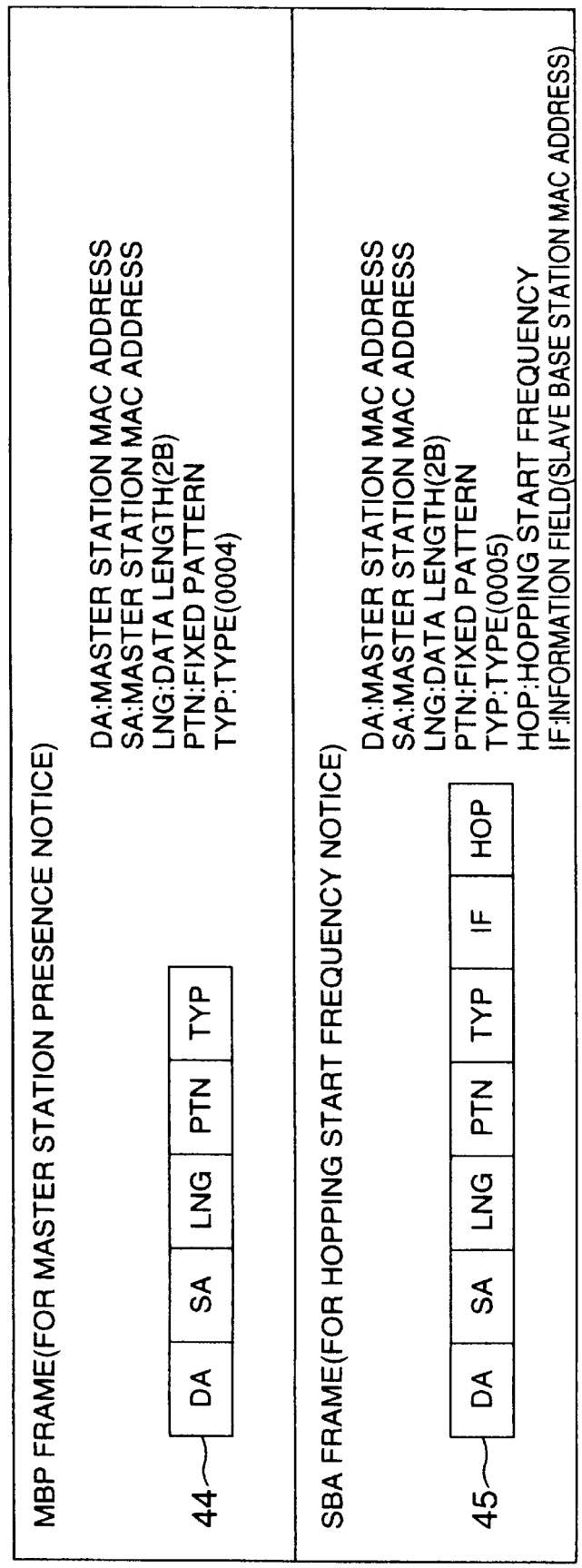

WIRELESS LAN SYSTEM AND BASE STATION APPARATUS

BACKGROUND OF THE INVENTION

The present invention relates to a wireless LAN system and a base station apparatus therefor, and more particularly to a wireless LAN system which determines one of a plurality of base station apparatus connecting wired LANs and wireless LANs as a master base station and prevents interference between wireless LANs connected to the respective base station apparatus, and a base station apparatus therefor.

As a prior art wireless LAN system, a system disclosed in "Medium Access Control Protocols for Wireless LANs" IEEE 802.11 Working Document, IEEE P802.11/92-39 has been known.

The disclosed wireless LAN system is a wireless LAN system in which a plurality of communication apparatus (hereinafter referred to as base stations) are connected between wired LANs and wireless LANs. A frequency hopping spread spectrum system sequentially shifts a carrier frequency to be used by a group of terminals such as personal computers subscribed to the wireless LANs of the respective base stations, in accordance with a predetermined hopping period. The disclosed wireless LAN system shifts the frequency in the same series for each wireless LAN as a series of frequency shifts (hopping series).

The above prior art wireless LAN system of the frequency hopping spread spectrum system uses the same hopping series f0–fn and hopping period for each wireless LAN as shown in FIG. 12. However, since it does not pay attention to a timing of the frequency hopping for commanding by wireless to cells (terminals) in each wireless LAN, when areas of wireless LANs 5, 6 and 7 of base stations 2, 3 and 4 connected to LAN 1 overlap as shown in FIG. 13, that is, when electromagnetic wave reachable areas of the base stations 2, 3 and 4 overlap, interference between wireless LANs causes a problem.

Namely, in FIG. 13, a hatched area 8 of the areas of the wireless LANs 5 and 6 overlap and the terminals in this area 8 can receive electromagnetic waves from both base stations 2 and 3. Under this circumstance, when a terminal within the area 8 transmits or receives a wireless LAN frame to or from the base station 2 and if carrier frequencies of the wireless LANs 5 and 6 are same frequency f4 at a time T1 as shown in FIG. 14, the terminals belonging to the wireless LAN 5 are interfered by the wireless LAN frame of the wireless LAN 6, which causes material reduction of a transmission efficiency and a transmission quality.

Namely, the terminal in each wireless LAN detects a vacant state of the wireless channel to the base station by detecting that on other terminals issue electromagnetic wave, and starts the transmission of the wireless LAN frame to the base station. If it happens that the vacant channel is not present by the interference of the wireless LAN frame by the same carrier frequency, the terminal in the area 8 which is to start the transmission of the wireless LAN frame to the base station 2 has to wait until the transmission/reception of the wireless LAN 6 is completed or retransmission is required due to the interference by the wireless LAN frame, and the transmission efficiency is lowered.

Further, the transmission quality is lowered by the interference by the wireless LAN frame.

Particularly, when the Reed-Solomon sequence is used as the hopping sequence, the interference of wireless LAN frame occurs at a rate of once per period at maximum in any two sequences. When n wireless LANs using n-hop sequence are overlapped, the interference occurs at every time and the transmission efficiency and the transmission quality are further materially lowered.

Those problems also occur when the terminals belonging to the wireless LAN 6 in the area 8 transmit or receive.

U.S. Pat. No. 5,394,433 discloses a control system for automatically managing the frequency hopping in a wireless network. The system comprises a wireless network manager (WNM) or wireless network control unit and a wireless control agent (WCA) which control the distribution and maintenance of a hopping pattern in the wireless communication network. In a single cell network, the WNM and the WCA are included in one base station, and in a multi-cell network, the WNM is located in a specific station on the LAN and the WCA is located at each station on the LAN. In each case, the WNM is a central control station and the WCA functions as a cell control unit. In this control system, a hopping pattern is allocated to each base station to prevent the interference with the WNM located at the predetermined base station or station.

U.S. Pat. No. 4,872,205 discloses a frequency hopping communication system which detects other system operating within an area by monitoring a predetermined radio frequency of a fixed duration when the system is initially enabled. When the predetermined frequency is detected, the system recognizes that a master system operates within the area and uses a first predetermined communication frequency group and hence it selects second and third predetermined communication frequency groups. When the predetermined radio frequency is not detected, the system becomes the master system and selects the first predetermined communication frequency group for the communication within the system and starts the transmission of the predetermined radio frequency to inform a master status.

U.S. Pat. No. 4,850,036 discloses a frequency hopping radio communication system comprising a control apparatus for transmitting or receiving to or from a plurality of slave stations by using a frequency hopping mode of operation. During a start-up mode, the control apparatus communicates a start message to each slave station by using a predetermined frequency. The message identifies to each slave station a frequency hopping sequence to be used to select the frequency for transmission or reception to or from the control apparatus, from a group of frequencies. The message also specifies to each slave station an inherent start frequency to start the transmission or reception, among the frequency hopping sequence. The transmissions of all slave stations are synchronized with the transmission of the control apparatus so that any two stations cannot simultaneously use the same frequency for the transmission or reception to or from the control apparatus.

SUMMARY OF THE INVENTION

It is an object of the present invention to provide a wireless LAN system which can transmit and receive various data without lowering the transmission efficiency and the transmission quality even in an environment where a plurality of wireless LAN areas overlap, and a base station apparatus therefor.

It is another object of the present invention to provide a wireless LAN system of a frequency hopping spread spectrum system having a plurality of base stations in which one base station as a master station assigns different hopping start frequencies to respective base stations to allow the transmission and reception of various data without lowering the transmission efficiency and the transmission quality, and a base station apparatus therefor.

It is other object of the present invention to provide a wireless LAN system of a frequency hopping spread spectrum system having a plurality of base stations in which when a master base station for assigning different hopping start frequencies to respective base stations cannot normally attain its function by a failure, any one of other base stations becomes as the master base station to allow the transmission and reception of various data without lowering the transmission efficiency and the transmission quality, and a base station apparatus therefor.

In order to achieve the above objects, the present invention is featured in that a specific frame is transmitted and received among a plurality of base stations through a communication line such as a wired LAN segment to determine any one of the base stations as a master base station, the master base station assigns different hopping start frequencies to all base stations including the own base station, and each base station sequentially hops the carrier frequency of the same hopping sequence starting from the assigned hopping start frequency.

Further, in order to achieve the above objects, the master base station transmits a frame indicating the presence of the master base station periodically at a constant interval, and the slave base stations other than the master base station continuously monitor the reception of the frame to detect any abnormal operation of the master base station, and when it is detected, the specific frame is transmitted and received among the plurality of base station s through the communication line such as the wired LAN segment to determine any one of the base stations as the master base station.

In accordance with the wireless LAN system of the present invention, the specific frame is transmitted and received among the plurality of base stations connected to the same communication line such as a wired LAN segment to determine a sole master base station.

The master base station may be determined in the following manner.

Namely, at the start-up of each base station, a specific frame including address information of its own station is transmitted to the wired LAN at a predetermined interval and the reception of a specific frame including address information having a higher priority than that of its own or the reception of a frame indicating the presence of the master base station is monitored, and when the specific frame including the address information having the higher priority is received or the frame indicating the presence of the master base station is received, determination is made that there is other base station which can be a master base station or there is a base station which has already been determined as the master base station and the transmission of the specific frame is stopped. When none of the above conditions is met, a negotiation procedure to determine its own base station as the master base station is used.

The base station which has become the master base station transmits the frame indicating the presence of the master base station to the wired LAN at the predetermined interval. Other base stations monitor the reception of the frame indicating the presence of the master base station within a predetermined time period, and if they do not receive, they transmit frames indicating the absence of the master base station to the wired LAN. Each base station, when it receives the frame indicating the absence of the master base station, determines a new master base station in the same manner as that in the start-up.

Where the wired LAN does not support a frame which does not transit between segments such as a MAC frame (for example, Ethernet), a self-source/self-destination frame having transmission source and transmission destination MAC addresses as well as a MAC address of its own base station set therein is used as the specific frame to be used to determine the master base station. A self-source self-destination frame having the MAC address of the master base station set for both the transmission source and transmission destination MAC addresses is used as the frame indicating the presence of the master base station and the frame indicating the absence of master base station. Each base station is assumed to function as a bridge or a switching hub and hence can receive all frames so that it can receive and process the self-source self-destination frame transmitted by other base station.

When the master base station is determined, the master base station assigns different hopping start frequencies to the other base stations and the master base station and other base stations hop the carrier frequencies of the same hopping sequence synchronously at the same timing.

Namely, the master base station stores a base station address corresponding to each hopping start frequency for a plurality of predetermined hopping start frequencies. When the hopping start frequency of its own base station is not determined, the base station address assigns an undetermined hopping start frequency as the hopping start frequency of its own base station.

On the other hand, other base stations transmit frames indicating request for assignment of the hopping start frequency to the wired LAN. When the master base station receives the frame, it extracts the address information of the transmission source base station from the frame and assigns a hopping start frequency whose corresponding base station address is undetermined as the hopping start frequency of the transmission source base station. Thereafter, it informs the assigned hopping start frequency to the transmission source base station through the wired LAN.

In this manner, since the hopping start frequency of each base station is centrally controlled by the master base station, the interference among the wireless LANs can be prevented even in the overlapping environment of the wireless LANS. As a result, the data can be transmitted and received without lowering the transmission efficiency and the transmission quality.

BRIEF DESCRIPTION OF THE DRAWINGS

The objects and features of the present invention will be apparent from the following detailed description of the embodiments of the present invention and the drawings.

FIG. 3 shows a configuration and an application of a timer used by the base station, FIG. 4 shows a frame used by the base station, FIG. 5 shows a frame used by the base station.

DETAILED DESCRIPTION OF THE PREFERRED EMBODIMENTS

The embodiments of the present invention are explained in detail with reference to the accompanying drawings.

Figure 1:
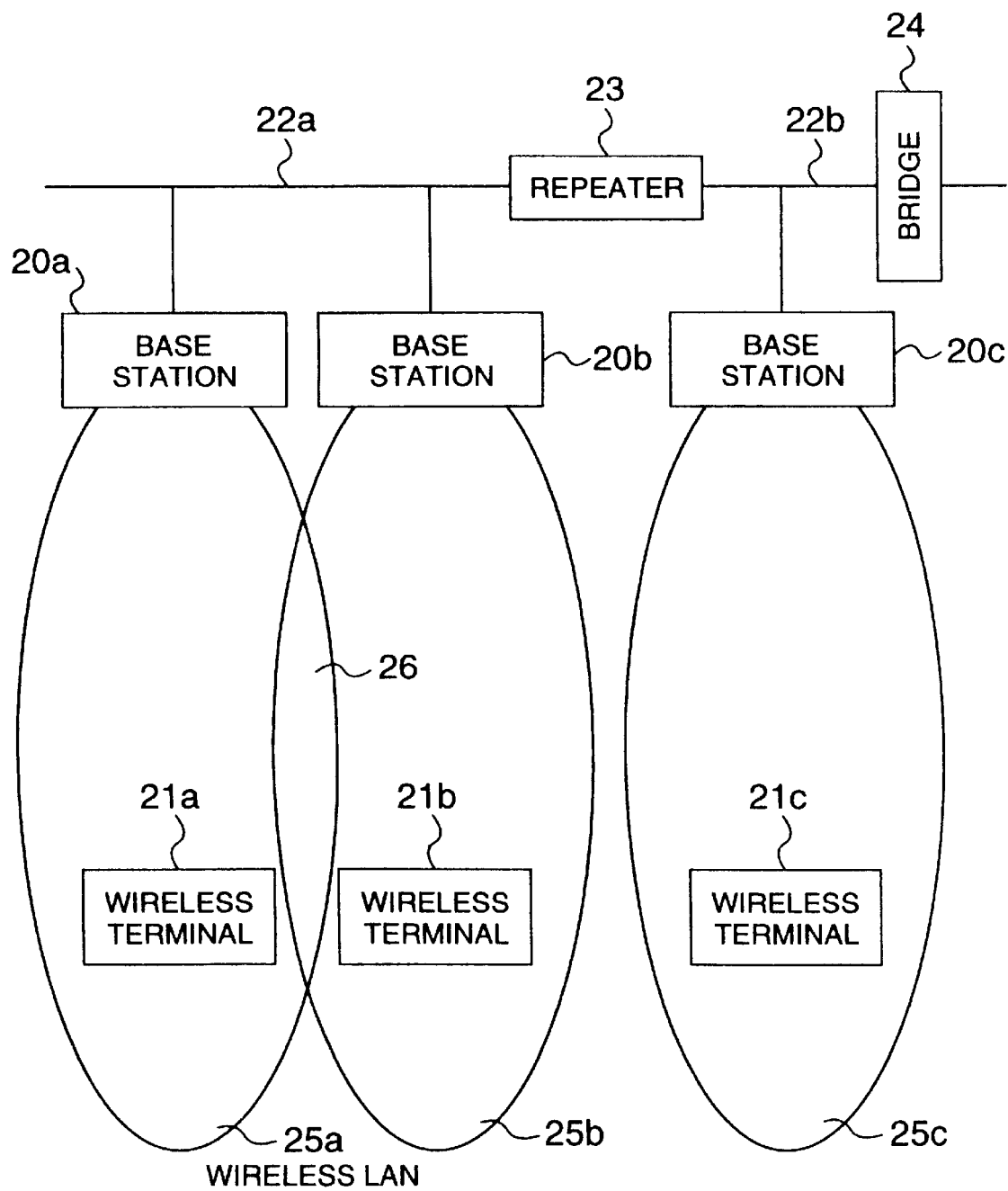
FIG. 1 shows an overall configuration of one embodiment of a wireless LAN system of the present invention.

FIG. 1 shows an overall configuration of an embodiment of the wireless LAN system of the present invention.

The wireless LAN system of the present embodiment comprises wired LANs 22a and 22b, a repeater connecting the wired LANs 22a and 22b, base stations 20a, 20b and 20c connected to the wired LANs 22a and 22b, a bridge 24 for connecting the wired LAN 22b to an external LAN, wireless LANs 25a, 25b and 25c connected to the base stations 20a, 20b and 20c, respectively, and wireless terminal devices 21a, 21b and 21c subscribed to the wireless LANs 25a, 25b and 25c.

Since the wired LANs 22a and 22b are connected by the repeater, those two LANs constitute one segment.

The two wireless LANs 25a and 25b overlap in an area 26.

The base stations 20a, 20b and 20c have MAC (media access control) addresses A, B and C, respectively, with the address values being C>B>A.

Figure 2:
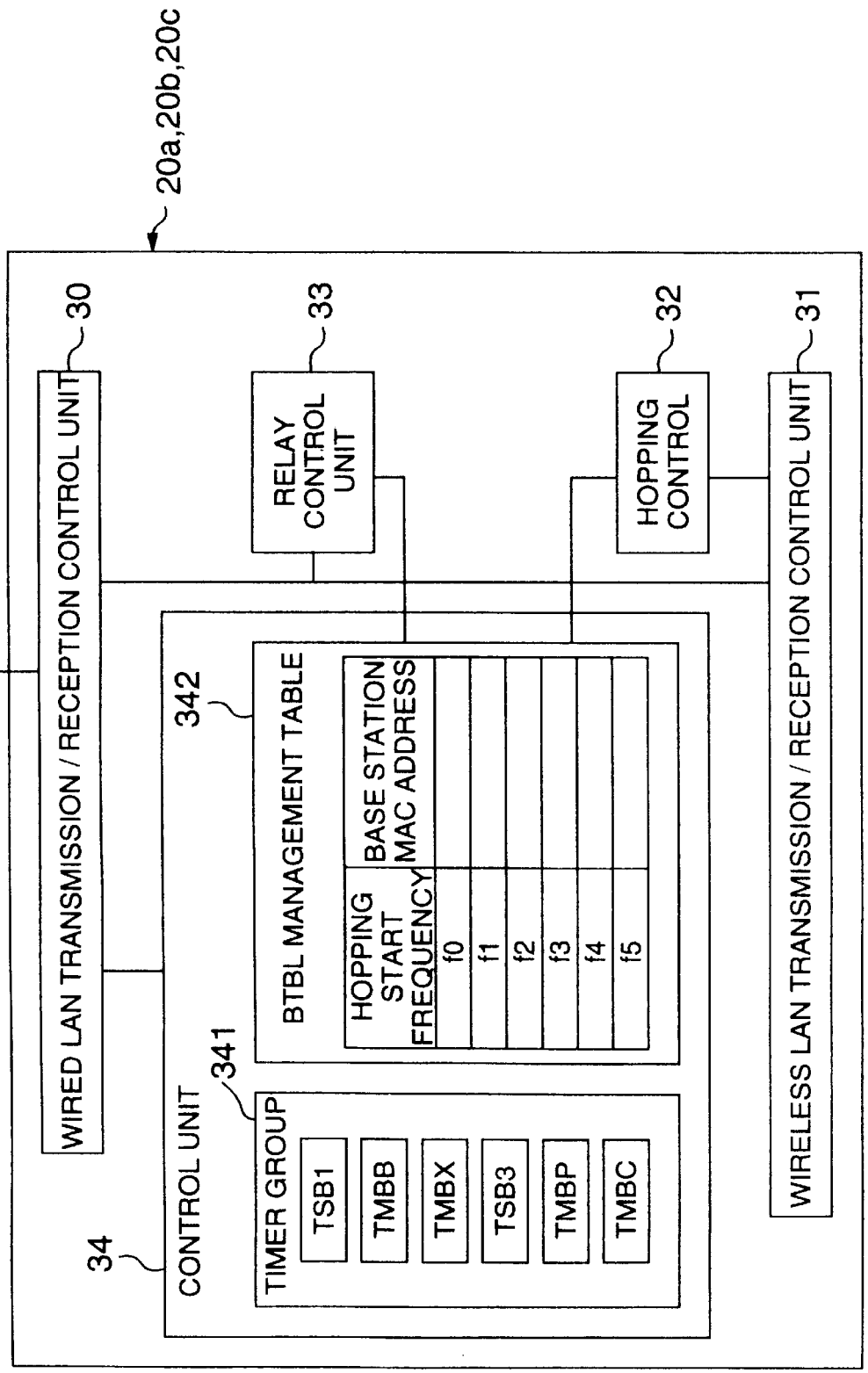
FIG. 2 shows a block diagram of a detailed configuration of a base station.

FIG. 2 shows a block diagram of a detailed configuration of the base stations 20a, 20b and 20c. Each of the base stations 20a, 20b and 20c comprises a wired LAN transmission/reception control unit 30 for controlling the transmission and reception of frames for the wired LANs 22a and 22b, a wireless LAN transmission/reception control unit 31 for controlling the transmission and reception of frames for the wireless LAN 25a connected to its own base station, a hopping control unit 32 for controlling the hopping of the carrier frequencies for the wireless LANs 25a, 25b and 25c connected to its own station, a relay control unit 33 for filtering or forwarding a frame received by the wired LAN or the wireless LAN, modifying it as required and transmitting it to a destination LAN, and a control unit 34 for controlling its own base station.

The control unit 34 has a timer group 341 a management table 342 called a BTBL and the timer group 341 comprises various timers TSB1, TSBB, TSBX, TSB3, TMBP and TMBC used to determine the master base station.

Application and default values of those timers TSB1, TSBB, TSBX, TSB3, TMBP and TMBC are shown in FIG. 3. Namely, the timer TSB1 is used as a timer to define a transmission interval of an SBP1 frame (to be described later) for negotiating the determination of the master base station, and the timer value is set to 55 ms, for example.

The timer TMBB is used as a timer to define a time period for determining that its own base station is the master base station in the master base station determination negotiation process and the timer value is set to 550 ms, for example.

The timer TMBX is used as a timer to define a timeout of the master base station determination negotiation process and the timer value is set to 150 s, for example.

The timer TSB3 is used as a timer to define a transmission interval of the SBP frame for requesting a hopping start frequency and the timer value is set to 110 ms, for example.

The timer TMBP is used as a timer to define a transmission interval of the MBP frame for informing the presence of the master base station and the timer value is set to 1 s, for example.

The timer TMBC is used as a timer to define a timeout to monitor the reception of the BMP frame and the timer value is set to 5 s, for example.

On the other hand, the management table (BTBL) 342 stores a corresponding relation between the hopping start frequencies and the MAC addresses of the respective base stations, and at the start-up, only the hopping start frequencies are registered by prefix and the MAC addresses of the base stations are not registered.

Both the timer group 341 and the management table 342 are logical and they may be readily implemented either by dedicated hardware or software.

FIGS. 4 and 5 show configurations of transmission and reception frames of the wired LAN used to control the base stations. They include five types of frames, SBP1 frame 41, SBP3 frame 42, SBC frame 43, MBP frame 44 and SBA frame 45.

The SBP1 frame 41 is a frame transmitted by each base station to determine the master and comprises DA=transmission destination MAC address, SA=transmission source MAC address, LNG=data length (two bytes), PTN=fixed pattern and TYP=type (0001).

The SBP3 frame 42 is used by the slave base station (the base station other than the master base station) to request the assignment of the hopping start frequency to the master base station and comprises DA=master station MAC address, SA=master station MAC address, LNG=data length (two bytes), PTN=fixed pattern, TYP=type (0002) and IF=information field (slave base station MAC address).

The SBC frame 43 is used to inform the absence of the master base station and comprises DA=master station MAC address, SA=master station MAC address, LNG=data length (two bytes), PYN=fixed length pattern and TYP=type (0003).

The MBP frame 44 is a frame used by the master base station to inform the presence of the master base station and comprises DA=master station MAC address, SA=master station MAC address, LNG=data length (two bytes), PTN=fixed pattern and TYP=type (0004).

The SBA frame 45 is a frame for informing the hopping start frequency to the slave base station and comprises DA=master station MAC address, SA=master station MAC address, LNG=data length (two bytes), PTN=fixed pattern, TYP=type (0005), IF=information field (slave base station MAC address) and HOP=hopping frequency.

Of the five types of frames 41–45, the four types of frames 42–45 excluding the SBP1 frame 41 are self-source self-destination frames by the master base station MAC address. The fixed pattern PTN of each frame is for discriminating a normal frame from the frames shown in FIGS. 4 and 5 and it may use the 802.2 LLC header defining SAP.

The five types of frames 41–45 are generated by the control unit 34 and transmitted to the wired LANs 22a and 22b by the transmission/reception control unit 30 for the wired LANs 22a and 22b. On the other hand, the frames 41–45 transmitted by the other base stations are received by the transmission/reception control unit 30 and transferred to the control unit 34.

Figure 6:
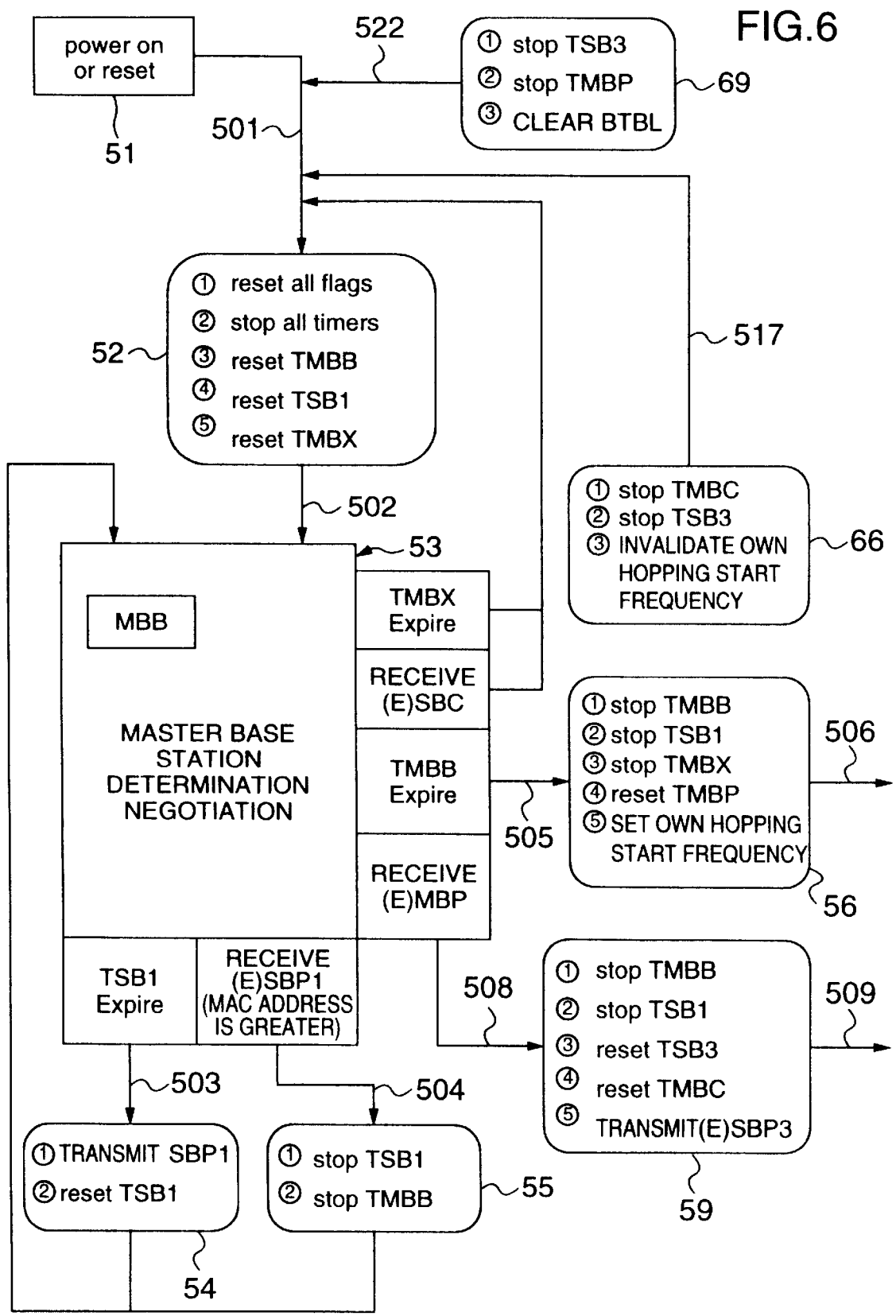
FIG. 6 shows a status transition chart of a negotiation process to determine a master base station.
Figure 7:
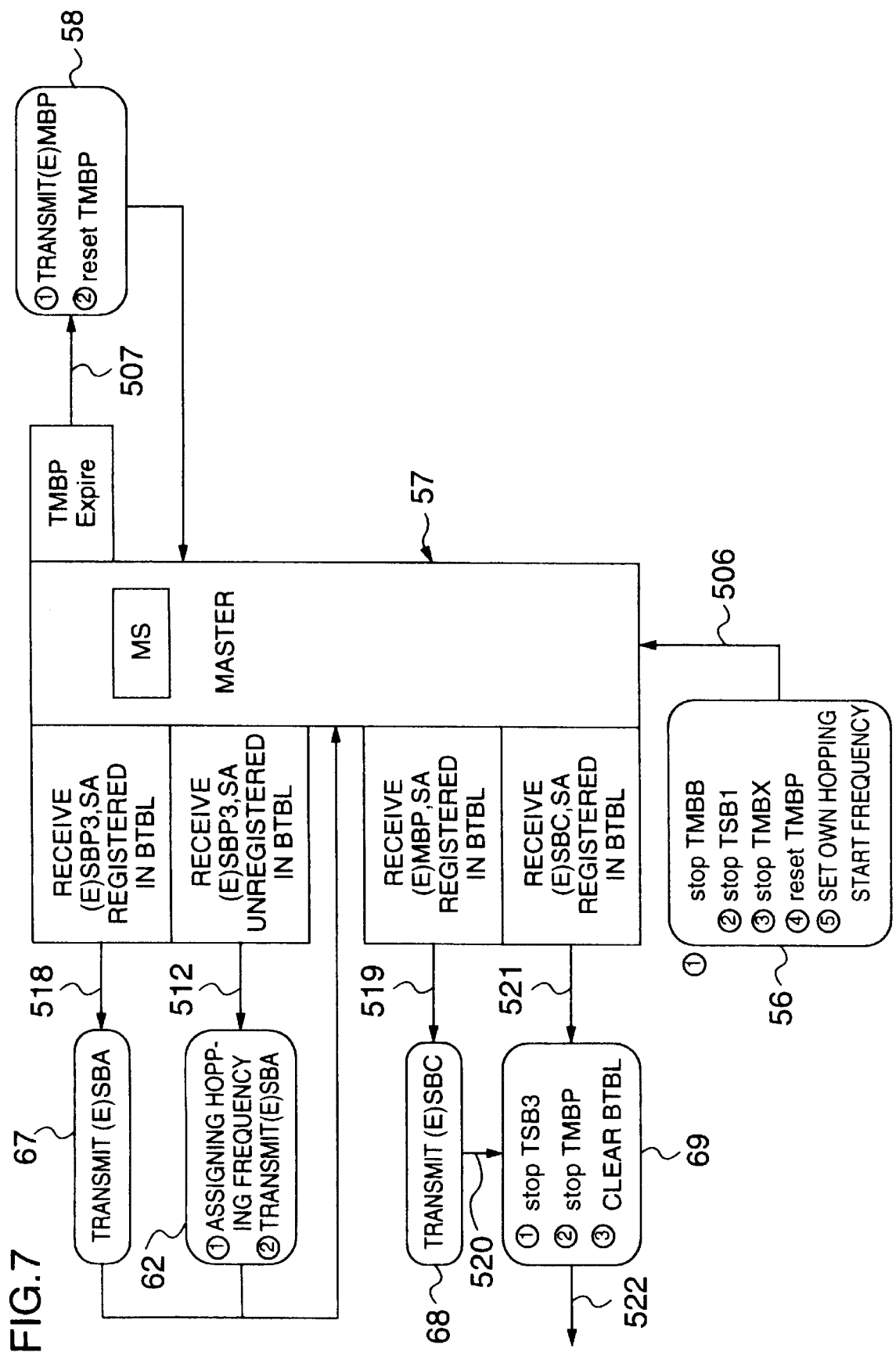
FIG. 7 shows a status transition chart of a master station determination process.
Figure 8:
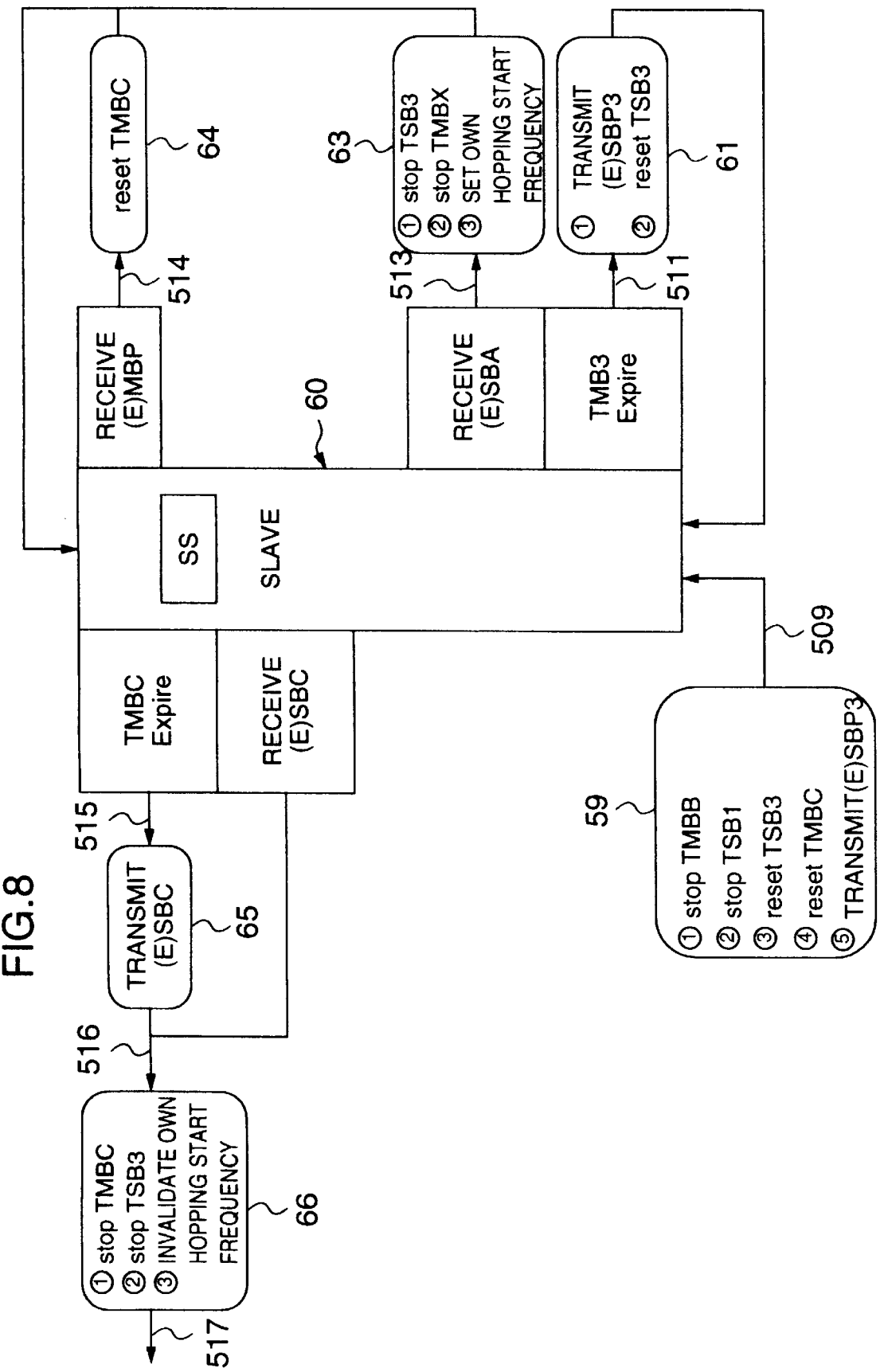
FIG. 8 shows a status transition chart of a slave base station.

FIGS. 6 to 8 show status transition charts of the base stations 20a–20c for the determination of the master base station. The possible status of each of the base stations 20a–20c are classified to the following three major classes:

(1) master base station determination negotiation
(2) master base station
(3) slave base station An event or action with a header (E) indicates an event or action in the wired LAN. The action having a timer operation designated such as by "reset TMBB" means the start after the resetting of the corresponding timer. The action with a header of a circled numeral indicates the sequence of execution of the action.

Operations of the base stations 20a–20c when they are simultaneously powered by actuating a power supply breaker are explained with reference to the respective drawings.

When each of the base stations 20a–20c is powered (state 51), the process transits to a state 52 along a route of a transition line 501, and all timers are now stopped and all flags are reset, and then the timers TMBB, TMBX and TSB1 are reset and started. Then, the process transits to a state 53 or master base station determination negotiation state along a transition line 502.

In the master base station negotiation state 53, each of the base stations 20a–20c monitors the expiration of the TSB1 timer (TSB1 Expire), and upon the expiration of the TSB1 timer, the process transits to a state 54 along a transition line 503 where the SBP1 frame 41 is transmitted to the wired LANs 22a and 22b and the timer TSB1 is reset and started.

Thus, each of the base stations 20a–20c periodically transmits the SBP1 frame 41 at the period of the timer value of the timer TSB1 until other event which causes a state transition or an event which causes the stop of the TSB1 timer occurs.

Namely, each of the base stations 20a, 20b and 20c transmits the SBP1 frame 41 having the transmission destination address DA and the transmission source address SA to its own base station MAC address=A, B or C at the period of 55 ms. The base stations 20a and 20b receive the SBP1 frame transmitted by the base station 20c substantially simultaneously with the transmission of the SBP1 frame by its own base station.

When each of the base stations 20a, 20b and 20c transmits the SBP1 frame, it substantially simultaneously receives the SBP1 frame from other base station through the wired LAN, and when it receives the SBP1 frame from other base station, it determines whether the transmission destination MAC address and the transmission source MAC address in the received SBP1 frame have a higher priority than the MAC address of its own base station.

As described above, the MAC address C of the base station 20c is larger than A and B. Namely, the MAC address C of the base station 20c is of highest priority and the MAC address B of the base station 20b is next higher.

Accordingly, when the base stations 20a and 20b receive the SBP1 frame 41 from the base station 20c, the process transits to a state 55 along a transition line 504 where the timer TSB1 is stopped to stop the periodic transmission of the SBP1 frame and the timer TMBB is also stopped.

On the other hand, since the base station 20c does not receive the SBP1 frame 41 having the MAC address of a higher priority than that of its own, it continues the periodic transmission of the SBP1 frame 41 and monitors the expiration of the timer TMBB.

When the base station 20c detects the expiration of the timer TMBB (TMBB Expire), the process transits to a state 56 along s transition line 505 where all timers TMBB, TSB1 and TMBX used in the master base station determination negotiation state are stopped and the TMBP timer is also stopped. After the determination of the hopping start frequency of its own base station 20c, the process transits to a master state of FIG. 7 through a transition line 506.

When the base station 20c transits to the master state, it determines the hopping start frequency of its own base station 20c by looking up the management table (BTBL) 342.

In the present embodiment, there is no prefix registration in the MAC addresses of the management table (BTBL) 342. Namely, the hopping start frequencies of all base stations 20a–20c are not yet set. Thus, the base station 20c registers the MAC address C of its own base station 20c in the MAC address of the base station corresponding to the hopping start frequency f0 first registered in the management table (BTBL) to set the hopping start frequency of its own base station 20c to f0.

Then, the base station 20c which is now master base station monitors the expiration of the timer TMBP (TMBP Expire) started in the state 56, and upon the expiration of the timer TMBP, the process transits to a state 58 through a transition line 507 where it transmits the MBP frame 44 to the wired LAN 22b and resets and starts the timer TMBP.

Since this operation is periodically conducted at the set time of the timer value of the timer TMBP, the MBP frame 44 is periodically transmitted to the wired LANs. Namely, the MBP frame 44 is transmitted to the wired LANs 22a and 22b at an interval of one second.

On the other hand, the base stations 20a and 20b are in the master base station determination negotiation state 53. Under this condition, when it receives the MBP frame 44 first issued by the master base station 20c, the process transits to a state 59 through a transition line 508 where all timers TMBB and TSB1 used in the master base station determination negotiation are stopped, the timers TSB3 and TMBC are reset and started to transmit the SBP3 frame 42 to the wired LAN, and the process transits to a slave state 60 shown in FIG. 8 through the transition line 509. Namely, the base stations 20a and 20b which could not become the master base station transmit the SBP3 frame 42 for requesting the assignment of the hopping start frequency and the process transits to the slave state 60.

In the slave state, when the timer TSB3 expires, the base stations 20a and 20b determine that the SBP3 frame 42 did not reach the master base station 20a and the base stations 20a and 20b transit to a state 61 through a transition line 511 where they again transmit the SBP3 frame 42 and reset and start the TSB3 timer.

On the other hand, when the master base station 20c receives the SBP3 frame 42 from the slave base stations 20a and 20b, it transits to a state 62 through the transition line 51 provided that the MAC addresses of the slave base stations 20a and 20b which transmitted the SBP3 frame 42 are unregistered, where the hopping start frequencies of the slave base stations 20a and 20b whose MAC addresses are unregistered are determined and the SBA frame 45 for informing the hopping start frequency is transmitted to each of the slave base stations 20a and 20c.

The determination of the hopping start frequencies of the slave base stations 20a and 20b by the master base station 20c is conducted by using the management table 342 as it is for the master base station 20c.

If the MAC address of the transmission source base station has been registered in the management table 342 when the SBP3 frame 42 is received, the process transits to a state 67 through a transition line 518 to transmit the SBA frame 45.

Assuming that the reception of the SBP3 frame 42 from the base station 20a is prior to the reception of the SBP3 frame 42 from the base station 20b, the master base station 20c extracts the MAC address A of the transmission source base station from the information field IF of the SBP3 frame 42 when it receives the SBP3 frame 42 from the base station 20a, searches a vacant column in the base station MAC address of the management table (BTBL) 342, and registers the MAC address of the transmission source address A in the first found vacant column.

In the present embodiment, the vacant column is the base station MAC address column corresponding to the hopping start frequency f1. Thus, the hopping start frequency of the base station 20a is decided to f1. For the base station 20b, the hopping start frequency f2 is decided in the same manner.

Figures 9, 10:
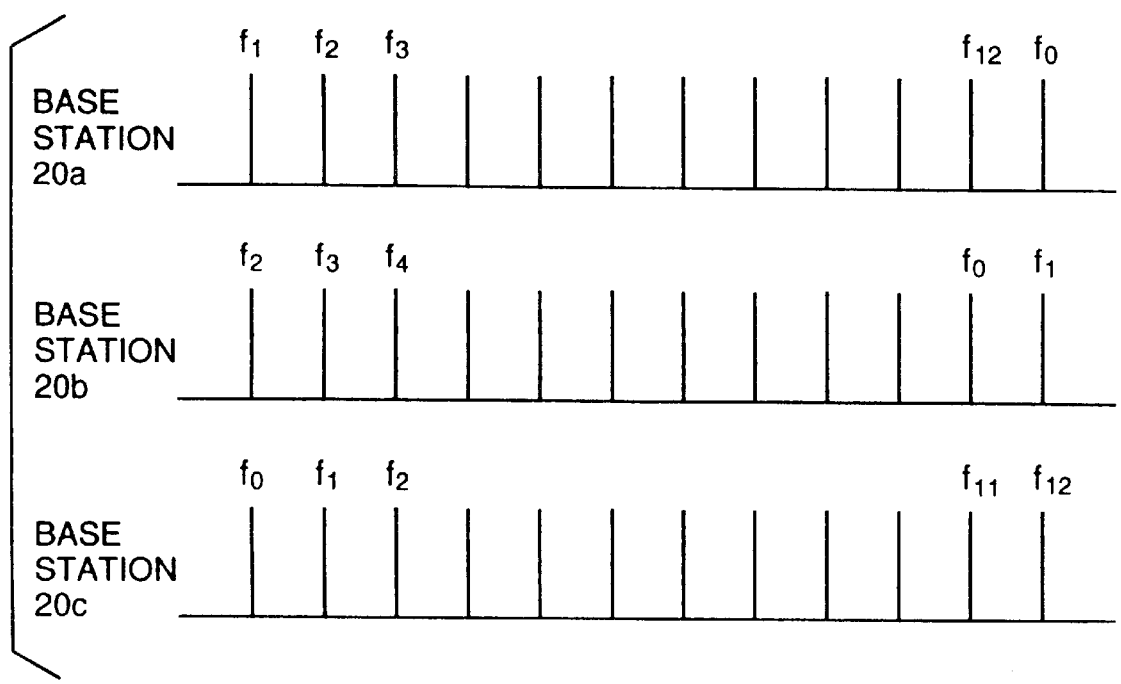
FIG. 9 shows an example of content of a management table in the embodiment.
FIG. 10 shows an example of hopping start frequencies assigned to respective base stations.

A content of the management table (BTBL) 342 of the master base station 20a after the determination of the hopping start frequencies of the base stations 20a and 20b is shown in FIG. 9.

When the base stations 20a and 20b receive the SBA frame 45 from the master base station 20c, the process transits to a state 63 through a transition line 513 where the timers TSB3 and TMBX are stopped and the information HOP of the hopping start frequency is acquired from the SBA frame 45 and it is set as the hopping start frequency of its own station.

In this manner, when the master station 20c assigns different hopping start frequencies to the respective base stations, it transmits a synchronization frame to the slave base stations to hop the respective carrier frequencies synchronously at the same timing.

The wireless terminal devices 21a, 21b and 21c receive the hopping start frequency information and the hopping timing commands from the base stations covering the areas in which the respective terminal devices are located and shift the hopping frequencies in synchronism with the corresponding base stations.

When the hopping start frequencies are assigned as shown in FIG. 9, the carrier frequencies of the respective base stations are hopped as shown in FIG. 10.

Figure 11:
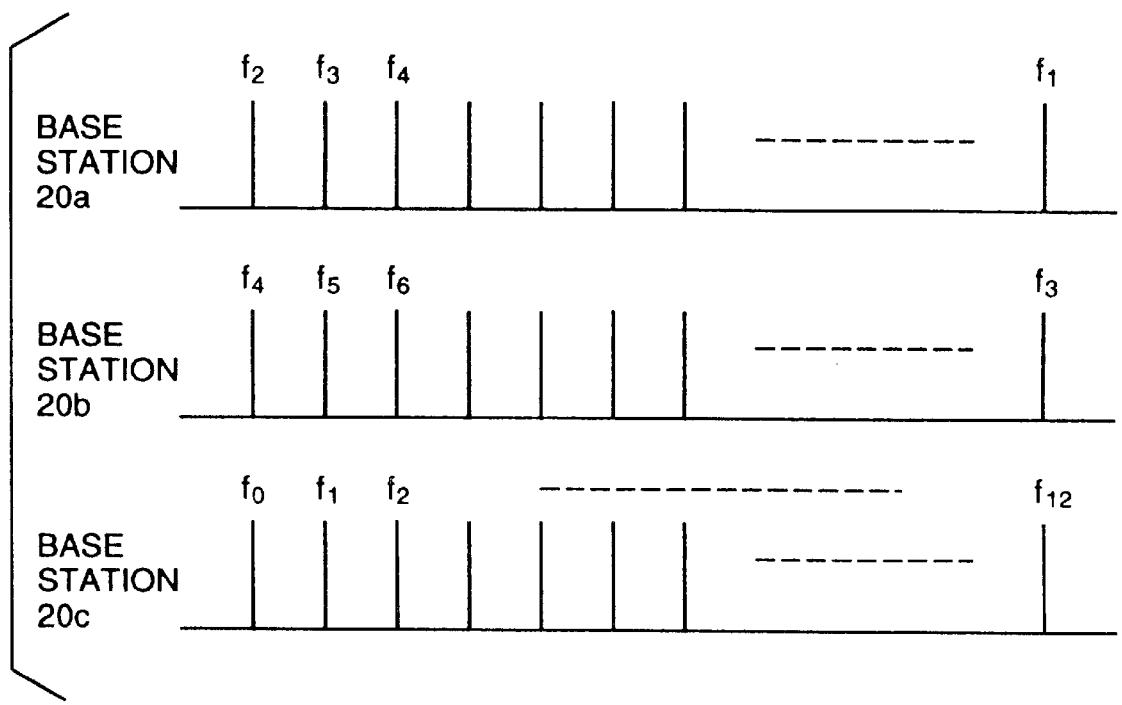
FIG. 11 shows other example of the hopping start frequencies assigned to the respective base stations.
Figure 12:
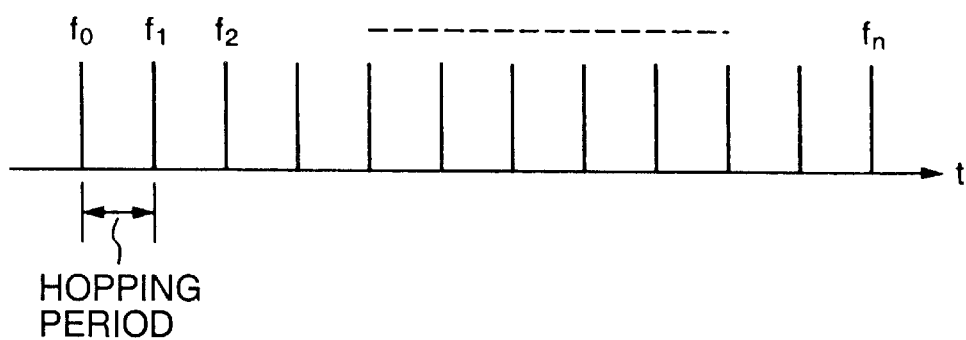
FIG. 12 shows an example of a frequency hopping sequence.
Figure 13:
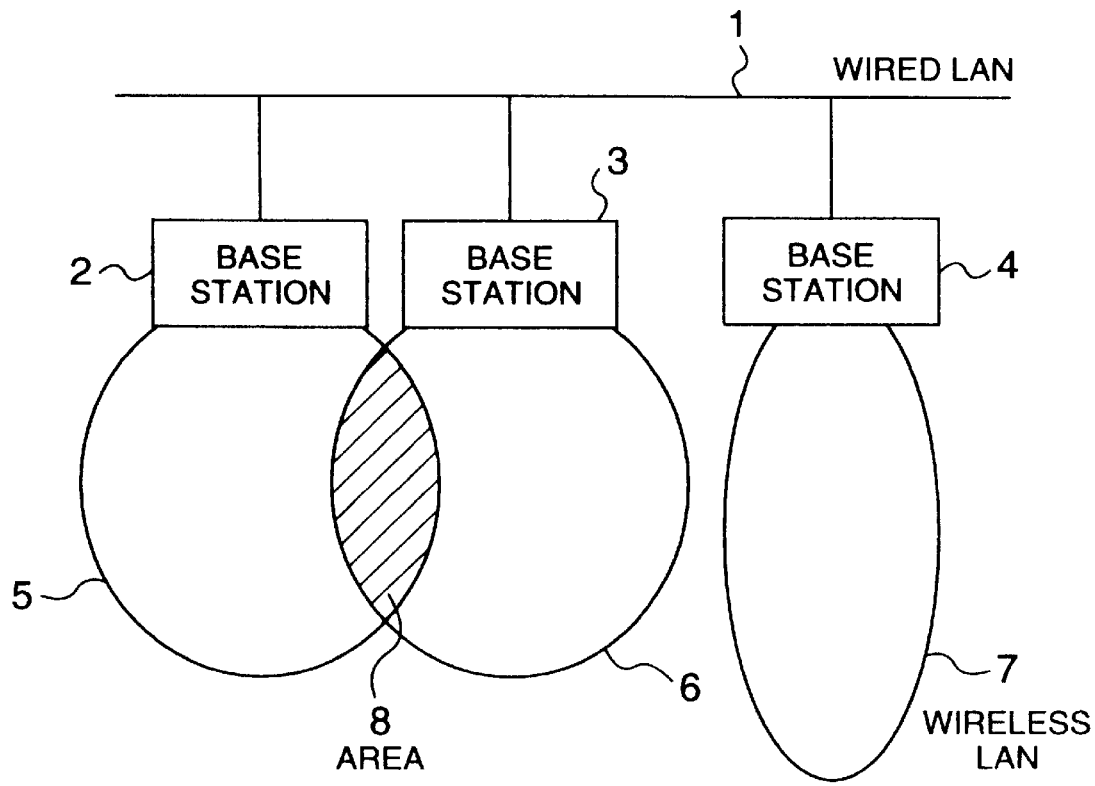
FIG. 13 shows a configuration of a prior art wireless LAN system, and FIG. 14 shown an example where hopping frequencies of two base stations are same.
Figure 14:
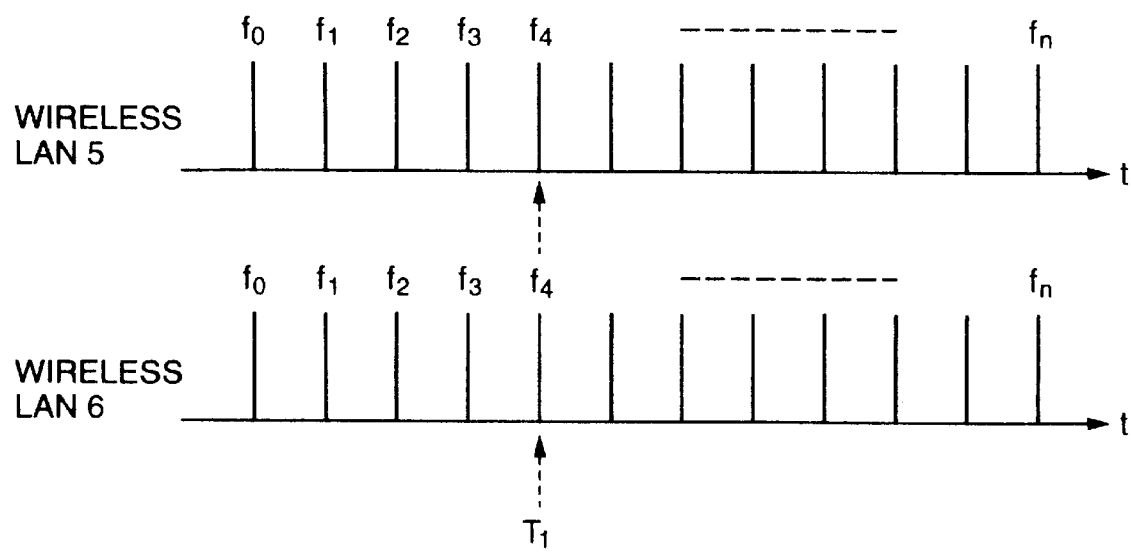

In this case, the assignment of the hopping start frequencies and the shift of the hopping start frequencies are conducted such that the frequencies are staggered by one hop, the present invention should not be limited thereto, but the frequencies may be staggered by two hops as shown in FIG. 11.

The determination procedure of the master base station and the operation to determine the hopping start frequencies of the respective base stations when the base stations 20a–20c connected to the wired LAN segment are simultaneously started up have been described. When a new base station is subscribed to the wired LAN segment having base station already started the operations connected thereto, the operation is simpler.

Namely, the newly subscribed base station receives the MBP frame 44 from the existing master base station in the master base station determination negotiation state 53 and the process transits to the slave state 60. The subsequent operation is same as that of the base stations 20a and 20b described above.

An operation when the master base station 20c cannot attain the function as the master base station by power shut-down or failure is now explained.

The slave base stations 20a and 20b continuously monitor the reception of the MBP frame 44 from the master base station 20c by using the timer TMBC during the operation thereof. When the slave base station 20a or 20b receives the MBP frame 44, the process transits to the state 64 through the transition line 514 to start and reset the timer TMBC.

However, when the MBP frame 44 is not received during the period of the timer value of the timer TMBC, the slave base stations 20a and 20b determine that the master base station 20c is absent. Namely, the master base station 20c continuously transmits the MBP frame 44 at an interval of one second but when the slave base stations 20a and 20b do not receive the MBP frame 44 for five seconds which is the timer time of the timer TMBC due to the failure of the master base station 20c, they determine the absence of the master base station 20c.

Upon the expiration of the timer TMBC, the slave base stations 20a and 20b transits to the state 65 through the transit line 515 where they transmit the SBC frame to the wired LAN to inform the absence of the master base station. They further transit to the state 66 through the transition line 516 where all timers TMBC and TSB3 used in the slave state are stopped and the process transits to the same state as that of the start-up state through the transition line 517.

When the slave base station receives the SBC frame 43 from other slave base station, it transits to the same state as that of the start-up upon the reception of the SBC frame 43.

As a result, all base stations 20a, 20b and 20c are in the master base station determination negotiation state 53 in synchronism with the SBC frame 43, and a new master base station is determined.

Thus, the absence of the master base station for a long time period is avoided. In the present embodiment, if the master base station 20c is powered off and separated from the wired LAN, one of the slave base stations 20a and 20b transmits the SBC frame 43 and the other receives it and both base stations 20a and 20b transit to the master base station determination negotiation state 53 so that the new master base station is determined. In the present embodiment, since it follows the priority of the MAC address, the base station 20b is determined as the master base station.

When the master base station 20c receives the MBP frame 44 from the other base station 20a or 20b and the received MAC address has been registered in the management table 342, a plurality of master base stations are determined. Thus, the process transits to a state 68 through a transition line 519 where the SBC frame 43 is transmitted, and the process transits to a state 69 through a transition line 520 where the timer TSB3 and the TMBP are stopped and the management table 342 is cleared, and the process returns to the initial state through a transition line 522 where the master base station determination negotiation process is again conducted.

This is same when the SBC frame 43 is received from the other base station after the master base station 20c has been determined. In this case, the process transits to a state 69 through a transition line 521 where the timers TSB3 and TMBP are stopped and the management table 342 is cleared, and the process returns to the initial state through a transition line 522 where the master base station determination negotiation process is again conducted. The reception of the SBC frame 43 from the other base station after the master base station 20c has been determined occurs when the slave base station cannot receive the SBC frame 43 transmitted from the master base station 20c due to the break of the wired LAN. When such a state occurs several times, the control unit 34 generates a message and informs it to the manager.

In the present embodiment, the MAC address is assumed as the address of the base station used to determine the master base station and the hopping start frequency. Alternatively, other information unique to the base station such as an IP address or other address may be used to implement the present invention.

In the present embodiment, the information transmitted from the master base station to the slave base station is limited to the hopping start frequency and the slave base station MAC address. Alternatively, other information such as a hopping sequence may be transmitted. When a control channel is provided in addition to the information channel in the base station and the wireless terminal device, the control channel may be used to conduct the master base station determination negotiation process.

Further, in the present embodiment, the base stations are connected by the wired LAN. Alternatively, they may be connected by a wireless LAN using an electromagnetic wave or an infrared ray of a specific frequency or a dedicated wired communication line.

In accordance with the wireless LAN system of the present invention, a plurality of base stations connected to the same wired LAN segment transmit and receive the specific frames to determine the sole master base station which in turn assigns the different hopping start frequencies to the respective base stations. Thus, the interference between the wireless LANs can be avoided even in the overlapping environment of the wireless LANs and various data can be transmitted and received without lowering the transmission efficiency and the transmission quality.

Further, the slave base station continuously monitors the frame for informing the absence of the master base station from the master base station and when it does not receive the frame over the predetermined time period, the master base station determination process is conducted again. Thus, the interference among the wireless LANs due to the absence of the master base station is avoided and the reliability is enhanced.

What is claimed is:

1. A wireless LAN system having a plurality of wireless LANs comprising base stations and wireless terminal devices wherein said base stations and said wireless terminal devices in said wireless LANs communicate while sequentially hopping carrier frequencies and said base stations in said wireless LANs communicate with each other by inter-base station communication means, each of said base stations comprising:

determination means for transmitting and receiving a specific frame including address information of its own base station to and from other base stations through said inter-base station communication means to determine whether its own base station is a master base station or not; and master base station determination means responsive to an output of said determination means indicating that its own base station is the master base station, for assigning different hopping start frequencies to its own base station and other base stations.

2. A wireless LAN system according to claim 1 wherein said master base station determination means transmits the specific frame including address information of its own base station to the other base stations through said inter-base station communication means at a predetermined period upon the start-up of each of said base stations, and determines its own base station as the master base station when the specific frame including the address information having a higher priority than that of its own base station or a frame indicating the presence of the master base station is not received within a predetermined time period.

3. A wireless LAN system according to claim 1 wherein each of said base stations further comprises means for transmitting a frame requesting the assignment of the hopping start frequency to the master base station through said inter-base frame station communication means when its own base station is not determined as the master base station.

4. A wireless LAN system according to claim 3 wherein said hopping start frequency assignment means assigns different hopping frequencies to the respective base stations for the assignment request from the other base station not determined as the master base station, and informs it to the assignment requesting base station through said inter-base station communication means.

5. A wireless LAN system according to claim 1 wherein the specific frame used by said master base station determination means is a self-source self-destination frame having a transmission destination address and a transmission source address set to a MAC address unique to the base station transmitting the specific frame.

6. A wireless LAN system according to claim 1 wherein each of said base stations further comprises means for transmitting a frame indicating the presence of the master base station to other base stations at a predetermined period through said inter-base station communication means when its own base station is the master base station, and means for monitoring the frame indicating the presence of the master base station from the master base station when its own base station is not the master base station and when the frame is not received over a predetermined time period, transmitting a frame indicating the absence of the master base station to other base stations through said inter-base station communication means and then transiting to the master base station determination process by said master base station determination means.

7. A wireless LAN system according to claim 6 wherein the frame for indicating the presence of the master base station, the frame for indicating the absence of the master base station and the frame for requesting the assignment of the hopping frequency are frames having the transmission destination address and the transmission source address set to a MAC address unique to the master base station.

8. A wireless LAN system according to claim 1 wherein said inter-base station communication means communicates through a wired LAN connecting said base stations.

9. A base station apparatus of a wireless LAN system having a plurality of wireless LANs comprising the base station apparatus and wireless terminal devices wherein said base station apparatus and said wireless terminal devices in said wireless LANs communicate while sequentially hopping carrier frequencies and said base station apparatus in said wireless LANs communicate with each other by inter-base station communication means, said base station apparatus comprising:

determination means for transmitting and receiving a specific frame including address information of its own base station to and from other base station apparatus through said inter-base station communication means to determine whether its own base station is a master base station or not; and master base station determination means responsive to an output of said determination means indicating that its own base station is the master base station, for assigning different hopping start frequencies to its own base station and other base stations.

10. A base station apparatus according to claim 9 wherein said master base station determination means transmits the specific frame including address information of its own base station to the other base stations through said inter-base station communication means at a predetermined period upon the start-up of each of said base stations, and determines its own base station as the master base station when the specific frame including the address information having a higher priority than that of its own base station or a frame indicating the presence of the master base station is not received within a predetermined time period.

11. A base station apparatus according to claim 9 wherein each of said base stations further comprises means for transmitting a frame requesting the assignment of the hopping start frequency to the master base station through said inter-base frame station communication means when its own base station is not determined as the master base station.

12. A base station apparatus according to claim 11 wherein said hopping start frequency assignment means assigns different hopping frequencies to the respective base stations for the assignment request from the other base station not determined as the master base station, and informs it to the assignment requesting base station through said inter-base station communication means.

13. A base station apparatus according to claim 9 wherein each of said base stations further comprises means for transmitting a frame indicating the presence of the master base station to other base stations at a predetermined period through said inter-base station communication means when its own base station is the master base station, and means for monitoring the frame indicating the presence of the master base station from the master base station when its own base station is not the master base station and when the frame is not received over a predetermined time period, transmitting a frame indicating the absence of the master base station to other base stations through said inter-base station communication means and them transiting to the master base station determination process by said master base station determination means.

14. A base station apparatus according to claim 13 wherein the frame for indicating the presence of the master base station, the frame for indicating the absence of the master base station and the frame for requesting the assignment of the hopping frequency are frames having the transmission destination address and the transmission source address set to a MAC address unique to the master base station.

15. A base station apparatus according to claim 9 wherein the specific frame used by said master base station determination means is a self-source self-destination frame having a transmission destination address and a transmission source address set to a MAC address unique to the base station transmitting the specific frame.

16. A base station apparatus according to claim 9 wherein said inter-base station communication means communicates through a wired LAN connecting said base stations.

17. A method for determining a master base station in a wireless LAN system having a plurality of wireless LANs comprising base station apparatus and wireless terminal devices wherein said base station apparatus and said wireless terminal devices in said wireless LANs communicate while sequentially hopping carrier frequencies and said base station apparatus in said wireless LANs communicate with each other by inter-base station communication means, comprising the steps in each of said base stations of:

transmitting and receiving a specific frame including address information of its own base station to and from other base station through said inter-base station communication means to determine whether its own base station is a master base station or not; and in response to said determination step indicating that its own base station is the master base station, assigning different hopping start frequencies to its own base station and other base stations.

18. A method for determining a master base station according to claim 17 wherein said step for determining the master base station transmits the specific frame including address information of its own base station to the other base stations through said inter-base station communication means at a predetermined period upon the start-up of each of said base stations, and determines its own base station as the master base station when the specific frame including the address information having a higher priority than that of its own base station or a frame indicating the presence of the master base station is not received within a predetermined time period.

19. A method for determining a master base station according to claim 17 further comprising the steps of transmitting a frame requesting the assignment of the hopping start frequency to the master base station through said inter-base frame station communication means when its own base station is not determined as the master base station, and assigning different hopping start frequencies to the respective base stations for the assignment request from the other base station not determined as the master base station, and informing it to the assignment requesting base station through said inter-base station communication means.

20. A method for determining a master base station according to claim 17 further comprising the steps of transmitting a frame indicating the presence of the master base station to other base stations at a predetermined period through said inter-base station communication means when its own base station is the master base station, monitoring the frame indicating the presence of the master base station from the master base station when its own base station is not the master base station and when the frame is not received over a predetermined time period, transmitting a frame indicating the absence of the master base station to other base station through said inter-base station communication means, and transmitting and receiving the specific frame between the base station not determined as the master base station and each of other base stations through said inter-base station communication means to determine a new master station.

21. A wireless LAN system having a plurality of wireless LANs comprising base stations apparatus and wireless terminal devices wherein said base station apparatus and said wireless terminal devices in said wireless LANs communicate while sequentially hopping carrier frequencies and said base station apparatus in said wireless LANs communicate with each other through wired LANS, each of said base station apparatus comprising:

a wired LAN transmission/reception control unit controlling the transmission and reception of a frame to said wired LANs;

a wireless LAN transmission/reception control unit controlling the transmission and reception of a frame to said wireless terminal devices in said wireless LAN to which its own base station belongs;

a hopping control unit controlling the hopping of carrier frequencies in said wireless LAN to which its own base station belongs;

a relay control unit relaying the frame received by said wired LAN transmission/reception control unit from said wired LANs and the frames received by said wireless LAN transmission/reception control unit from said wireless LANs; and a control unit controlling an operation in its own base station apparatus;

said control unit transmitting and receiving a specific frame including address information of its own base station to and from other base station apparatus through said wired LANs to determine whether its own base station apparatus is a master base station apparatus or not, and in response to the determination that its own base station apparatus is the master base station apparatus, assigning different hopping start frequencies to its own base station apparatus and other base station apparatus.

22. A wireless LAN system according to claim 21 wherein said control unit transmits the specific frame including address information of its own base station apparatus to the other base station apparatus through said wired LANs at a predetermined period upon the start-up of each of said base stations, and determines its own base station apparatus as the master base station apparatus when the specific frame including the address information having a higher priority than that of its own base station apparatus or a frame indicating the presence of the master base station apparatus is not received within a predetermined time period.

23. A wireless LAN system according to claim 21 wherein said control unit of said base station apparatus transmits a frame requesting the assignment of the hopping start frequency to the master base station apparatus through said wired LANs when its own base station apparatus is not determined as the master base station apparatus, and assigns different hopping frequencies to the respective base station apparatus for the assignment request from the other base station apparatus not determined as the master base station apparatus and informs it to the assignment requesting base station apparatus through said wired LANs.

24. A wireless LAN system according to claim 21 wherein said control unit of said base station apparatus transmits a frame indicating the presence of the master base station apparatus to other base station apparatus at a predetermined period through said wired LANs when its own base station apparatus is the master base station apparatus, and monitors the frame indicating the presence of the master base station apparatus from the master base station apparatus when its own base station apparatus is not the master base station apparatus and when the frame is not received over a predetermined time period and transmits a frame indicating the absence of the master base station apparatus to other base station apparatus through said wired LANs and then transits to the master base station apparatus determination process.

25. A base station apparatus in a wireless LAN system having a plurality of wireless LANs comprising base station apparatus and wireless terminal devices wherein said base station apparatus and said wireless terminal devices in said wireless LANs communicate while sequentially hopping carrier frequencies and said base station apparatus in said wireless LANs communicate with each other through wired LANs, said base station apparatus comprising:

a wired LAN transmission/reception control unit controlling the transmission and reception of a frame to said wired LANs;

a wireless LAN transmission/reception control unit controlling the transmission and reception of a frame to said wireless terminal devices in said wireless LAN to which its own base station belongs;

a hopping control unit controlling the hopping of carrier frequencies in said wireless LAN to which its own base station belongs;

a relay control unit relaying the frame received by said wired LAN transmission/reception control unit from said wired LANs and the frames received by said wireless LAN transmission/reception control unit from said wireless LANs; and a control unit controlling an operation in its own base station apparatus;

said control unit transmitting and receiving a specific frame including address information of its own base station to and from other base station apparatus through said wired LANs to determine whether its own base station apparatus is a master base station apparatus or not, and in response to the determination that its own base station apparatus is the master base station apparatus, assigning different hopping start frequencies to its own base station apparatus and other base station apparatus.

26. A base station apparatus according to claim 25 wherein said control unit transmits the specific frame including address information of its own base station apparatus to the other base station apparatus through said wired LANs at a predetermined period upon the start-up of each of said base stations, and determines its own base station apparatus as the master base station apparatus when the specific frame including the address information having a higher priority than that of its own base station apparatus or a frame indicating the presence of the master base station apparatus is not received within a predetermined time period.

27. A base station apparatus according to claim 25 wherein said control unit transmits a frame requesting the assignment of the hopping start frequency to the master base station apparatus through said wired LANs when its own base station apparatus is not determined as the master base station apparatus, and assigns different hopping frequencies to the respective base station apparatus for the assignment request from the other base station apparatus not determined as the master base station apparatus and informs it to the assignment requesting base station apparatus through said wired LANs.

28. A base station apparatus according to claim 25 wherein said control unit transmits a frame indicating the presence of the master base station apparatus to other base station apparatus at a predetermined period through said wired LANs when its own base station apparatus is the master base station apparatus, and monitors the frame indicating the presence of the master base station apparatus from the master base station apparatus when its own base station apparatus is not the master base station apparatus and when the frame is not received over a predetermined time period and transmits a frame indicating the absence of the master base station apparatus to other base station apparatus through said wired LANs and then transits to the master base station apparatus determination process.

* * * * *